March 10, 1970     A. TUMA     3,499,461
COMBINED PIPE COUPLING AND PIPE FLUSHING DEVICE
Filed July 24, 1967     2 Sheets-Sheet 1
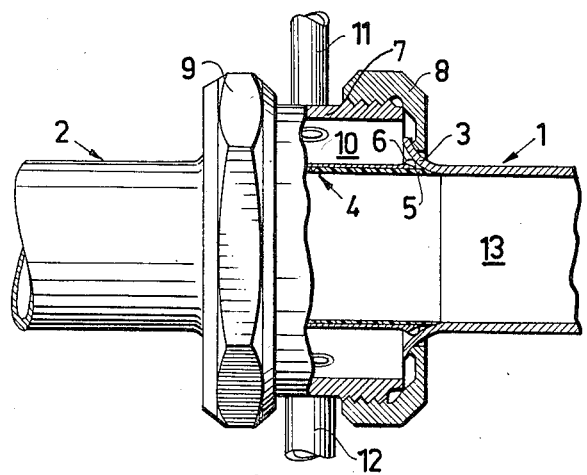
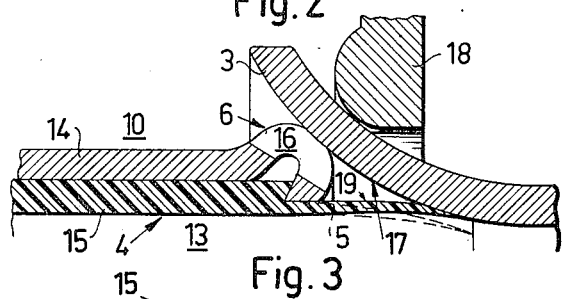
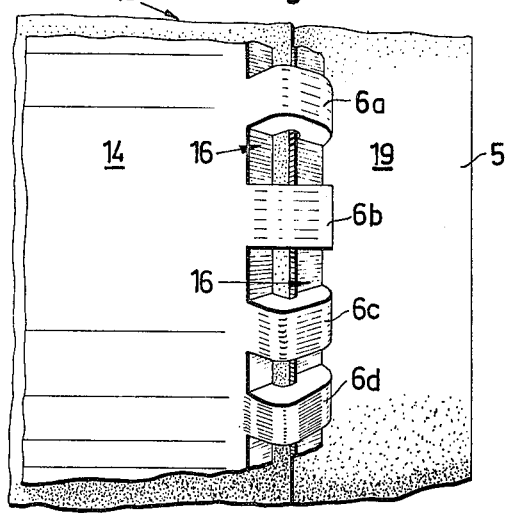
INVENTOR
Alex Tuma
BY Pierce, Scheffler & Parker
ATTORNEYS March 10, 1970     A. TUMA     3,499,461
COMBINED PIPE COUPLING AND PIPE FLUSHING DEVICE
Filed July 24, 1967     2 Sheets-Sheet 2
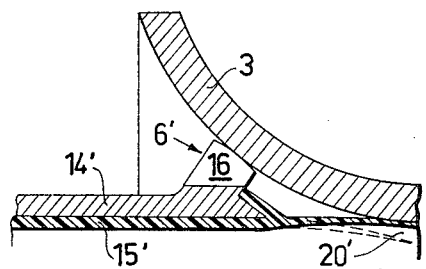
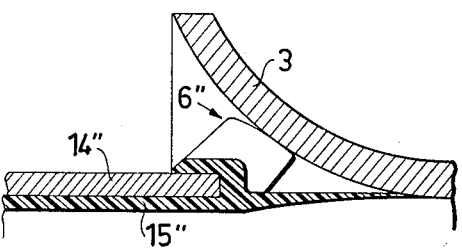
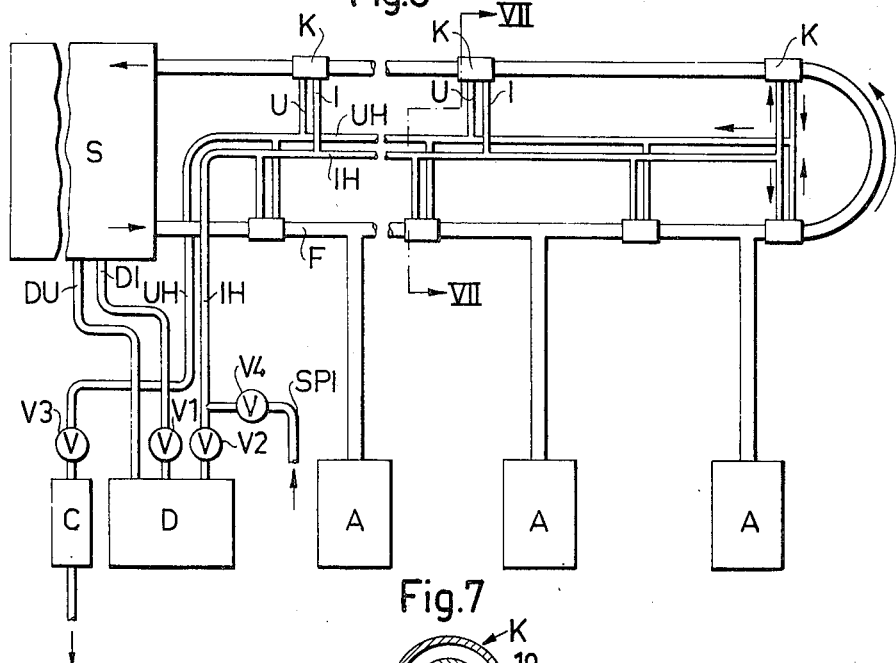
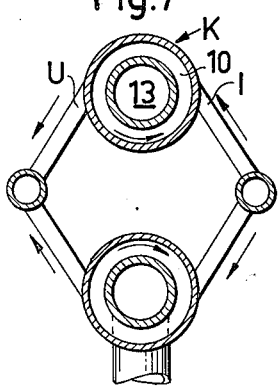
INVENTOR
Alex Tuma
BY *Pierce, Scheffler & Parker*
ATTORNEYS

United States Patent Office 3,499,461
Patented Mar. 10, 1970

3,499,461
**COMBINED PIPE COUPLING AND PIPE
FLUSHING DEVICE**
Alex Tuma, Loddekopinge, Sweden, assignor to AB
Tetra Pak, Lund, Sweden, a Swedish company
Filed July 24, 1967, Ser. No. 658,307
Claims priority, application Sweden, Aug. 15, 1966,
10,993/66
Int. Cl. F16k *19/00, 15/16*
U.S. Cl. 137—240     21 Claims

ABSTRACT OF THE DISCLOSURE

A device for coupling pipes together is provided having a chamber for a flushing material which may be admitted into the pipe through a non-return valve for cleansing and/or sterilizing the pipes to remove foreign matter which might collect at the joint. A pipe system employing the coupling device is also disclosed.

---

The present invention relates to a coupling for pipes or similar conducting or controlling elements having specially shaped sealing means between those elements which are meant to be coupled together, and to a pipe system comprising such couplings.

Although the invention may be used in several fields where sealing but nevertheless easily cleanable pipe couplings and pipe conduits are needed, e.g. in the chemical industry and, more specifically, in the dye and paint industries, it may also be used in breweries and dairies.

For transportation of aseptic milk from sterilizers to packaging machines the so-called aseptic installations are largely built according to the same legal and technical standards which correspond to a normal dairy or brewery installation for pasteurized liquid food. An exception from this are revolving pump shafts and pulsating piston rods, which have been awarded a unique position and therefore have been provided with double rubber gaskets and steam sluices in most aseptic installations. However, the pipe connections and joints have until now been considered as completely stationary elements, and therefore the rubber gaskets have been allowed to serve in the conventional way as separating means between sterile and non-sterile sections. From a strictly mechanical viewpoint the pipe connections and joints are not quite stationary, however. For example on account of temperature differences tensions will arise in pipe conduits and machine elements, and this often causes breaking stresses in the coupling points, which may in turn cause mutual displacements between the various coupling elements. Moreover, the installations are subjected to mechanical vibrations for different reasons, which may also cause positional changes in the coupling elements, and finally the transported material is not subjected to a strictly static pressure, but especially in large installations there will arise considerable pressure variations.

Moreover, in aseptic installations the rubber details will be exposed to considerably more stress, both mechanical and thermal, than is normally the case. In consequence of this and depending on conditions they will lose their original characteristics, such as resiliency, flexibility, smoothness, etc., in certain cases already after a single sterilization process.

The consequence of the said factors will be that some packages will sooner or later allow at least small quantities of the material (hereinafter called filling material or substrate) flowing through the conduits to pass. The material let through may very often stay on in cavities and spaces of the smallest imaginable volume, e.g. between the rubber and the metal. If the substrate is allowed to remain for some time, one can almost certainly count with colonies of bacteria developing. As a rule, a circulation sterilization of the installation cannot affect such colonies of bacteria, especially not those which contain heat resistant organisms.

The risk elements which have been pointed out can be neutralized in several ways. Some of them are entirely unacceptable, others are time-consuming and expensive. It must for instance be considered utterly dangerous to use completely welded drawn tubes since small cavities and cracks will easily form at the welding points, especially at welding points which are only accessible with difficulty during grinding operations. It is then only a question of time before these cavities and cracks have been enlarged so much by corrosion that hygienic inconveniences will arise. Local health authorities in most countries prescribe that also the tube drawing should be of such a kind that mechanical cleaning and visual inspection of all surfaces in contact with the filling material can be carried out.

A solution of the present problem may be achieved by excluding two danger elements existing in the conventional couplings of today, viz. the rubber details, where it is necessary to rely on the resiliency of the material, and all cavities or spaces where substrate rests may form colonies of bacteria.

Pipe couplings are previously known, for instance from the U.S. Patent 1,807,003, in which all rubber details have been eliminated and a sealing intermediate piece shaped like a metal ring has instead been arranged between the two pipe portions that are to be jointed, the metal ring and the pipe ends being formed in such a way that a displacement between the various details may be admitted while maintaining an acceptable sealing capacity. Through this arrangement a flexible coupling is obtained, in which case the metal ring is given both a sealing and a pressure receiving ability necessary for connecting the two pipe portions.

When handling such pipe couplings industrially, in which the sealing is provided by the mechanical contact pressure between two metal surfaces, it is, however, merely a question of time before the sealing metal surfaces are scratched or affected in other ways, so that the sealing ability disappears. The transported material thereby gets into contact with the environment and is consequently contaminated.

The pipe joint according to the invention has characteristics in common with this device which is previously known. Thus, there is arranged an intermediate piece between the two pipe ends also in the present pipe coupling, the intermediate piece preferably being arranged in such a way that it may slide on sliding surfaces on the pipe ends to provide a flexible coupling. As distinguished from the device according to the said U.S. Patent 1,807,003, the sealing and pressure receiving functions of the intermediate piece have, however, been separated. Thus, the sealing function has been transferred to a flexible sleeve bearing sealingly against an annular valve seat, while in the area of the mechanical pressure receiving contact between the intermediate piece and the pipe ends no sealing at all is obtained, but on the contrary said area is penetrated by channels forming passages between an outer annular flushing chamber and the outside of the sleeve. The object of this arrangement is on one hand to obtain a joint means of the sleeve which seals under operating conditions and which is substantially smooth on the inside of the pipe connection, and on the other hand to obtain a joint which is easy to clean. The latter wish may be fulfilled through the combined characteristic of the invention between the flexible sleeve and the outer flushing chamber. For if sterilizing and cleaning agents are led into the outer flushing chamber and the pressure inside it is high enough, the sleeve will be moved away from the annular valve seat, whereby the detergent may be caused to flush all surfaces in the joint. When the pressure in the chamber falls below a certain level in relation to the pressure inside the pipe, the sleeve returns to its sealing contact with the valve seat. Consequently, the sleeve and valve seat function as a non-return valve, the non-return direction corresponding to the direction out of the interior of the pipe conduit.

Several different embodiments are of course possible when making the coupling. For instance, it is theoretically possible within the scope of the invention to arrange the flexible sleeve necessary for the sealing and for the function of the non-return valve on the pipe end and to dispose a valve seat on the intermediate piece. This solution entails, however, such great technical problems, for instance fastening the sleeve on the pipe end, which creates new and difficult sealing and surface smoothness problems, that it can hardly be applied in practice. An embodiment of the pipe coupling with an intermediate piece very easy to produce and to mount will be described later. The pipe ends thereby obtain collars, whereby a natural valve seat for a sealing sleeve is obtained at each pipe end. In each pipe coupling there are consequently needed two sealing sleeves. These are preferably made in one piece shaped like a ring passing at both ends into flexible sealing tongues. The sealing ring in its turn is disposed inside another metal ring, in accordance with the embodiments which will be described in the following, preferably made of stainless, acid-proof steel, and is connected with this by being for instance welded, clamped, threaded, riveted or pulled over. Together, the two rings form the middle piece, the outer metal ring receiving the mechanical stresses and the inner sealing ring in combination with the valves seats performing the sealing and valve functions. Several kinds of materials are possible for making the sealing ring owing to such factors as pressure, temperature and chemical composition of the liquids that are to be conveyed and conducted through the filling material conduit and through the flushing chamber. Thus, both metals and plastics or combinations of these may be used for this purpose.

Under operating conditions the flushing chamber is preferably flushed with a sterile flushing liquid (or possibly flushing steam), which flushes away and removes traces of substrate, preferably by means of a circulating motion. For this purpose the flushing chamber is provided with connections for supplying and discharging the flushing liquid, the connections being preferably tangentially counted so that the desired circulation flow is obtained. During operation the filling material in the pipe conduit must be under higher pressure that the flushing liquid in the chamber, so that the sleeve is pressed against the valve seat, whereby it is guaranteed that the filling material will not be diluted with foreign materials. The desired pressure differences between the flushing chamber and the interior of the pipe conduit may be facilitated by the connecting conduit for flushing liquid entering the flushing chamber having a smaller diameter than the discharge conduit, whereby a pressure below atmospheric may arise in the chamber. The flushing liquid must for safety reasons be free from microorganisms, but does not have to be bactericidal.

The invention also relates to a conduit system which is provided with couplings of the described kind. In a dairy or an establishment comparable thereto there are usually a great number of packaging machines which are kept supplied from one or more sterilizers. Several machines are generally fed via one and the same filling material conduit, which forms a loop consisting of one supply conduit and one return conduit. The common method of sterilizing and cleaning the interior of the conduit consists in letting the detergent circulate from a cleaning unit, through the conduit system and back to the cleaning unit.

In accordance with the principles of the invention all pipe couplings are then sterilized and cleaned. This is arranged in the following way. A suitable cleaning agent or steam is led via a main supply conduit from the cleaning unit into all flushing chambers in the joint sleeves provided in the filling material conduit in question. All the exhaust conduits leaving the chambers carry flushing liquid to a common principal exhaust conduit under operating conditions. But during the cleaning operation this is closed, and therefore the cleaning liquid is forced into the empty filling material conduit, folding the sealing sleeves away from their valve seats. In this way, all the details of the sealing means are thoroughly flushed by the cleaning liquid, whereby all substrate rests, if any, are removed.

As mentioned, the outlets discharging the flushing liquid from the flushing chambers are connected to a main exhaust conduit for flushing liquid. Inside this conduit there is mounted a checking unit which gives a signal if the discharged flushing liquid contains traces of substrate, whereby the necessary check-up of the installation, such as inspection of the coupling nuts or the like, may be made.

As mentioned in the introduction, the range of application of the invention is not limited to the brewery and dairy industries, but may with great advantage be extended also to great parts of the chemical and pharmaceutical industries, the advantage of the invention lying in the simplicity and reliability in cleaning the conduit systems. Through the efficient cleaning and through the purposeful design of the pipe joints, especially the interiors of these, which have very even surfaces, it is possible to prevent the chemicals which are conveyed through the conduits from being contaminated by remaining rests of chemicals of other kinds which were previously conveyed through the same conduits. It will be realized that the selection of cleaning agents is dependent on the contamination expected. In for instance the paint industry and the petrochemical industry the cleaning agents may consist of organic solvents.

The invention will now be explained in greater detail with reference to the accompanying drawings, in which FIG. 1 is a partial section of a pipe coupling in accordance with an embodiment of the invention, FIG. 2 shows an enlarged detail of FIG. 1, FIG. 3 is a perspective view of a cut-out portion of a middle piece shown in FIG. 2, FIGS. 4 and 5 show alternative embodiments of the middle pieces shown in FIG. 2, FIG. 6 illustrates a pipe system in which there are included several pipe joints according to the invention as well as conduits for cleaning and flushing liquid connected to the pipe joint, and FIG. 7 shows an enlarged section VII–VII in FIG. 6.

In the figures only those details have been included which are adapted to illustrate the principles of the invention, while the other details have been left out, so that the essential features appear more clearly.

FIG. 1 shows a pipe joint chosen by way of example and intended to be used in a system for conveying sterile milk from a sterilizer to a packaging machine in which the milk is meant to be filled into sterile containers under aseptic conditions. With dimensional modifications, however, the same construction may be used also in other ranges of application and for other purposes, e.g. for sealing pump housings, valve housing or on the whole where it is necessary to create a tight but nevertheless easily cleanable transition piece between two cylindrical elements.

In the example chosen references 1 and 2, howver, designate two so-called dairy pipes connected by means of the device according to the invention. Each pipe shows a collared end portion 3. As the two pipe ends with their sealing means are analogically shaped, only one half of the figure has been shown in section. Between the two pipe ends there is disposed an annular middle piece 4, both ends of which have a flexible sealing sleeve 5 which lies sealingly against the collar portion 3 under operating conditions, viz when filling material (milk) is conveyed through the conduit 13. The middle piece 4 also has a "bead ring," which lies slidably against the collar 3 with its beads or raised portions 6. In the contact area between the bead ring and the collar no sealing is achieved, because a passage is arranged between each adjacent pair of beds. The purpose of the bead ring is as a matter of fact to take up the mechanical stresses acting on the middle piece.

The middle piece 4 is surrounded by a flushing chamber 10, the extension of which is defined, except by the middle piece also by a flushing housing 7 and two nuts 8 and 9. The flushing chamber 10 surrounding the middle piece 4 annularly has one inlet orifice 11 and an outlet orifice 12, the diameter of which is larger than the diameter of the inlet orifice. Both connecting orifices are disposed tangentailly into the chamber 10, so that when liquid is flushed through the chamber a circulating flowing motion is obtained.

In FIG. 2 the details in connection with the collar are shown on a larger scale. From this figure it appears that the middle piece 4 consists of two rings, viz on one hand an outer metal ring 14, intended to receive the mechanical stresses and dimensions for this purpose, and on the other hand an inner sealing ring 15 of a flexible material, preferably plastic.

The bead rings 6a, 6b . . . 6n are made in such a way that the metal ring 14 has been upset at both ends in a way which will appear distinctly in FIG. 2, whereupon the upset portions around the circumference of the whole ring have been cut in such a way that alternating raised portions or beads 6 and flute-shaped passages 16 have been obtained, The raised portions 6 lie slidably against the collar 3 in such a way that a certain motion of the coupling means may be allowed without the contact against the collar 3 being lost. Against the opposite side of the collar 3, the locking flange 18 of the nut 8 also lies slidably, said locking flange slightly flexible so that it may be subjected to a certain elastic deformation.

The inner surface of the collar 3 is polished, as its inner portion 17 must serve as an annular valve seat for the sealing tongue or sleeve 5. The exterior 19 of the sleeve 5 is in direct contact with the flushing chamber 10 via the channels 16. By keeping a pressure below atmospheric in the flushing chamber 10 in relation to the conduit 13 the sealing tongue 5 is sucked against the valve seat 17. If on the other hand the pressure in the flushing chamber 10 is raised above the pressure in the conduit 13 so much that also the initial pressure of the sealing tongue 5 against the valve seat 17 is overcome, the sealing tongue or the sleeve 5 will be folded towards the interior of the conduit 13. In FIG. 2 this position is shown in dot and dash lines. When the sleeve is folded outwards to this position there is created an annular slot 20 through which cleaning liquid may be made to flow into the conduit 13 from the flushing chamber 10 via the channels 16. When passing the slot 20 also the valve seat 17 and the extreme portion of the outside 19 of the sealing tongue 5 are flushed intensely, viz surfaces which have previously been in contact with each other and which are therefore impossible to reach with a detergent. When the pressure in the flushing chamber 10 sinks, the sleeve 5 returns to its sealing contact against the valve seat 17.

The metal ring 14, like the dairy pipes 1 and 2, the nuts 8 and 9 and the flushing housing 7, is made of acid-proof stainless steel, while the sleeve is made of plastic. Plastic materials which may be used in this case are for instance acetate plastic Delrin (polyoxymethylene), materials from the polycarbonate group, such as for instance Makrolon, the material Hostaform sold by Fabrieke Hoechst, or materials equivalent to nylon on the whole. Also metals may be used, although the range of application of metals are perhaps mostly fonud in the chemical industry, where concentrated acids or other agents may destroy plastics. Metals which may be used are for instance titanium, titanium alloys, and acid-proof stainless steel. Also combinations of different materials may be used. But it should be realized that the invention is not, of course, limited to a specific kind of material.

On account of the tangential orientation of the connecting orifices 11 and 12 there is obtained a circulating flow in the flushing chamber 10. If the orifice, as distinguished from the features shown in FIG. 1, are slightly displaced laterally from each other or are bent to one side, the direct discharge to the outlet orifice 12 may be reduced and the flushing intensified. As a result of the intense circulating flow through the flushing chamber 10, all the spaces which would otherwise be difficult to reach, will be effectively flushed.

The operation of the coupling may be varied considerably within the scope of the inventive idea. FIGS. 4 and 5 shows a couple of minor modifications of the middle piece 4. In FIG. 4 the metal ring 14' thus consists of a cast construction, on which the sealing ring 15' has been cast together. The method facilitates the creation of passages 16 and a slot 20' having very smooth limiting surfaces.

In the embodiment according to FIG. 5 the beads 6" constitute integral portions of the sealing ring 15". The metal ring 14" may consist of two portions, which are pressed sideways by means of an expansible middle element in such a way that the sealing ring 15" is retained. On account of the beads 6" in this case being of plastic, the sliding against the collar may be facilitated.

FIG. 6 is a diagrammatical view of a pipe system for conveying sterile milk and for cleaning the pipe system and the coupling means included therein. A milk sterilizer is designated S, whereas F designates a conduit for conveying the sterile milk to a number of aseptic packaging machines A. K designates pipe couplings made according to the principles of the invention. Each coupling thus contains an outer flushing chamber, which is designated 10 in FIG. 7 in the same way as in FIG. 1. In an analogous way the interior of the conduit F is designated 13. To the connecting orifices of each flushing chamber there are connected on one hand an inlet conduit I connected, on the other hand an outlet conduit U. All the inlet conduits I are united with a main inlet conduit IH, and all the outlet conduits U with a main outlet conduit UH. In the system there is also a central dish-washing installation D with connecting conduits DI and DU, which may be connected to the filling material conduit F via the sterilizing installations S. A checking and signalling unit C is connected into the main outlet conduit. SPI designates an inlet conduit for flushing liquid. A number of valves have been desiganted V1–V4.

The system is intended to operate in the following way. Immediately after the production is completed the filling material conduit F is cleaned by circulating movements by a dish-washing agent, which is propelled through the interor of the conduit, whereby the walls of the pipe conduit as well as the inner surface of the middle piece 4 (FIG. 1) facing the conduit are cleaned. The dish-washing agent comes from the central dish-washing installation D and is brought into the filling material conduit F via the open valve V1, the conduit DI and the pump system of the sterilizer S, and is returned to the dish-washing installation D via the conduit DU.

When the cleaning of the interior 13 of the conduit F is finished, the valve V1 is shut and the valve V2 is opened. The valves V3 and V4 are shut. Dish-washing or sterilizing agent, liquid or in the nature of super-pressure steam, is now directed into the flushing chambers 10 of the coupling means K via the main inlet conduit IH and the various inlet conduits I. Because the valve V3 in the main outlet conduit is shut, the detergent cannot, however, leave the flushing chambers via the outlet conduits U. The pressure in the flushing chambers will therefore rise to a value determined by the pumps of the dish-washing installation D. According to the invention this pressure is so high that the sealing sleeves are forced away from the valve seats 17. The sealing means and the flushing chambers will now be subjected to an effective cleaning treatment by the liquid revolving in the flushing chambers and further flowing through the channels 6 and the slots 20. This liquid is conducted through the filling material conduit F and the conduit DU back to the dish-washing installation D. When the system is completely sterile and free from substrate rests, the detergent is also removed by all the means being flushed with a suitable flushing liquid, which must of course be free from microorganisms, but does not necessarily have to be bactericidal in character. Sterilized water is an example of a flushing liquid.

During operation, i.e. when filling material is being conveyed through the filling material conduit F from the sterilizer S out to the packaging machines A the valves V1 and V2 are closed and the valves V3 and V4 are open. Through the conduit SPI flushing liquid (or steam) is introduced into the main inlet conduit IH.

From the main conduit IH the flushing liquid is carried off via the inlet conduits I to the various flushing chambers 10, in which the liquid is caused to circulate violently in consequence of the tangential introduction. Because of the fact that the valve V3 is open during operation and because of the fact that the outlet conduits U are thicker than the inlet conduits I (like the respective connecting orifices 11, 12 resp. FIG. 1) and because the pressure in the filling material conduit is relatively high during operation, there arises a pressure below atmospheric in the flushing chambers 10 in relation to the interior 13 of the conduit, which guarantees a high degree of sealing safety for the non-return valves, i.e. the sleeves and their valve seats between the flushing chambers 10 and the interior 13 of the conduit. If leakage in the filling material conduit should still occur no contamination of the filling material would be risked, as the joints are flushed by a sterile liquid or gas. If on the other hand substrate should leak out, this is carried away by the flushing liquid. By arranging a control member C, which is responsive to for instance milk fat, in the main outlet conduit UH an indication of the deposit of substrate in the flushing liquid is obtained. A warning lamp is preferably lit as a signal that a check-up has to be made or another measure has to be taken in the installation, such as a check-up of the coupling nuts or the like.

The invention, i.e. the coupling per se as well as the system in which the coupling is intended to be included, may be varied in many ways within the scope of the inventive idea. Modifications of the coupling have previously been mentioned. As to the construction of the pipe system this depends a lot on the character of the installation. Thus, in large installations the dish-washing and the sterilization may be done in sections. In order to check that each particular coupling is really being washed, there is also a possibility to clean each coupling separately, for instance by opening the valves in the inlet conduits I successively. In other installations the flushing of the flushing chambers during operation may be unnecessary or undesirable. In such installations the outlet conduits U may therefore be left out. The character of the flushing agent and the cleaning agent is of course completely dependent on the filling material. In the chemical industry the liquid detergent may consist of an organic solven capable of dissolving and removing remaining material rests, if any. If the filling material consists for instance of a poison gas or an explosive, the liqud which flows through the flushing chambers during operation may consist of an agent capable of taking up leaking material, if any, and neutralizing its injurious effect. From this example it should thus be realized that the invention is not limited by the present specification but only by the following claims.

I claim:
1. A device for coupling pipes and sealing the joint comprising a pair of pipes longitudinally spaced from each other, an annular sealing member disposed between the ends of said pipes, at least one end of said sealing member being flexible and adapted to cooperate with an annular valve seat formed on the inside of the end of at least one of the pipes to form an annular non-return valve, a housing surrounding and spaced from said sealing member, means engaging said housing and said pipes for coupling said spaced pipes, said housing and said sealing member forming an annular chamber communicating with the outside of said annular non-return valve, inlet means for introducing a flushing fluid into said chamber whereby when the pressure of the flushing fluid in said chamber exceeds the pressure of the fluid in said pipes, the flexible end of said sealing member will flex radially inwardly to allow the flushing fluid to enter and flush the insides of the pipes.

2. A device as claimed in claim 1 wherein the central portion of said sealing member between the ends thereof is substantially inflexible.

3. A device as claimed in claim 2 wherein both ends of the sealing member are flexible and cooperate with annular valve seats formed respectively on the inside of the opposed ends of the pipes.

4. A device as claimed in claim 3 wherein the ends of said sealing member have outwardly extending tapering cross-sections to form flexible sealing tongues.

5. A device as claimed in claim 1, wherein the inner surface of said sealing member is substantially smooth and forms a coextensive wall with the inner surfaces of said pipes.

6. A device as claimed in claim 1 wherein the sealing member comprises a plastic material.

7. A device as claimed in claim 3 wherein said sealing member further comprises means for reinforcing the central portion thereof to withstand compressive longitudinal mechanical stresses.

8. A device as claimed in claim 7 wherein the reinforcing means comprises a rigid annular sleeve forming the central portion of said sealing member.

9. A device as claimed in claim 8 wherein said rigid annular sleeve is composed of metal.

10. A device as claimed in claim 9 wherein the rigid annular sleeve is united with the plastic portion of said sealing member.

11. A device as claimed in claim 8 wherein the ends of said rigid annular sleeve bear against the ends of the opposed pipes radially outside of the annular valve seat formed on the inside of the ends of said pipes and wherein the ends of said rigid annular sleeve are provided with channels allowing communication between the annular chamber and the exterior surface of said flexible sealing members.

12. A device as claimed in claim 11 wherein the ends of the opposed pipes against which the ends of said rigid annular sleeve bear are provided with sliding bearing surfaces.

13. A device as claimed in claim 11 wherein the ends of said rigid annular sleeve are provided circumferentially with alternate channels and beads, said beads bearing against the ends of the opposed pipes.

14. A device as claimed in claim 13 wherein the beads are formed by inwardly turned portions of the ends of said rigid annular sleeve.

15. A device as claimed in claim 11 wherein the ends of the opposed pipes are flared outwardly to form collars, the insides of which constitute the bearing surfaces for the ends of said rigid annular member and the annular valve seats for the flexible ends of said sealing member.

16. A device as claimed in claim 1 wherein said housing, said sealing member and said pipe coupling means form the annular chamber for the flushing fluid.

17. A device as claimed in claim 15 wherein said pipe coupling means include means for resiliently engaging the exterior of the collars.

18. A device as claimed in claim 1 and further comprising outlet means for removing the flushing fluid from said chamber.

19. A device as claimed in claim 18 wherein said inlet and outlet means are connected non-radially to said chamber so as to mutually produce rotary circulation of the flushing fluid within said chamber.

20. A device as claimed in claim 19 wherein the inlet and outlet means are connected tangentially to said chamber.

21. A device as claimed in claim 18 wherein the outlet means has a greater diameter than said inlet means.

References Cited

UNITED STATES PATENTS

| | | | |
|---|---|---|---|
| 2,211,212 | 8/1940 | Langdon | 137—525.3 X |
| 2,884,230 | 4/1959 | Pyle | 137—525.3 X |
| 2,973,780 | 3/1961 | Coover | 137—525.3 X |
| 2,975,799 | 3/1961 | Stilwell | 137—525.3 X |
| 3,018,785 | 1/1962 | Adams | 137—525.3 X |
| 3,293,118 | 12/1966 | Putnam | 137—525.3 X |

CLARENCE R. GORDON, Primary Examiner

U.S. Cl. X.R.

137—525.3